May 12, 1925.
F. W. FRENCH
DEMOUNTABLE RIM FASTENER
Filed Aug. 1, 1924
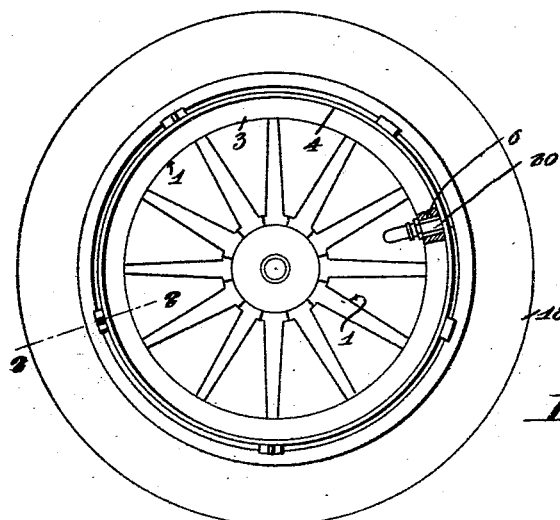
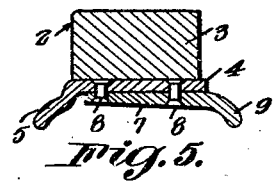
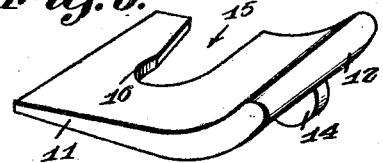
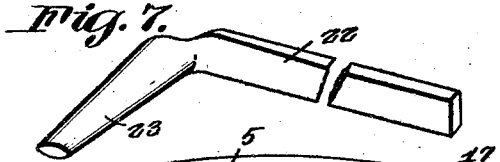
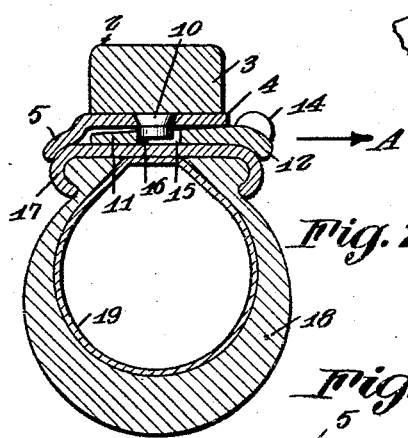
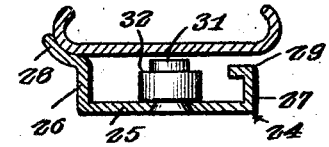
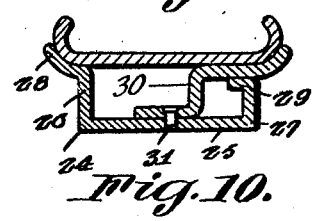
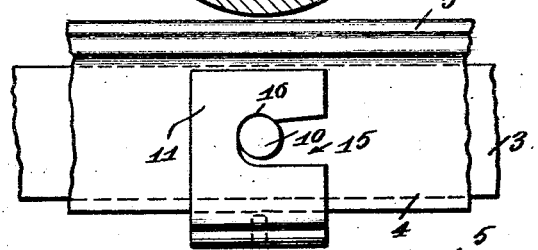
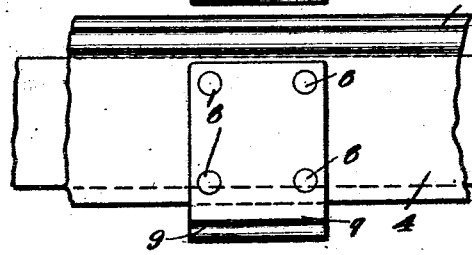
1,537,430

Patented May 12, 1925.

1,537,430

UNITED STATES PATENT OFFICE.

FREDERICK W. FRENCH, OF OAKLAND, CALIFORNIA.

DEMOUNTABLE-RIM FASTENER.

Application filed August 1, 1924. Serial No. 729,579.

*To all whom it may concern:*

Be it known that I, FREDERICK W. FRENCH, a citizen of the United States, residing at Oakland, in the county of Alameda and State of California, have invented a new and useful Demountable-Rim Fastener, of which the following is a specification.

This invention aims to provide a simple means whereby a demountable rim may be mounted quickly on a wheel body and with equal facility be removed therefrom, without rendering it necessary for the operator to remove a plurality of nuts as is now the customary practice.

It is within the province of the disclosure to improve generally and to enhance the utility of devices of that sort to which the invention appertains.

Although preferred forms have been shown in the drawings, it will be understood that a mechanic, working within the scope of what is claimed, may make changes without departing from the spirit of the invention.

In the drawings:—

Figure 1 shows in elevation, a vehicle wheel whereunto the device forming the subject matter of this application has been applied;

Figure 2 is a cross section on the line 2—2 of Figure 1;

Figure 3 is a fragmental plan showing one of the removable retainers;

Figure 4 is a fragmental plan disclosing one of the fixed retainers;

Figure 5 is a cross section taken through the wheel body;

Figure 6 is a perspective view illustrating one of the removable retainers;

Figure 7 is a perspective view showing the tool used in the operation of the device, parts being broken away;

Figure 8 is a fragmental elevation wherein appears a part of the wheel body and a part of the rim;

Figures 9 and 10 are cross sections illustrating how the device may be used on a wheel body which differs from that depicted in Figure 5.

The numeral 1 denotes a vehicle wheel comprising a body 2 including a felly 3 and a felly band 4 thereon, the felly band being provided at one side with a stop flange 5. An opening 6 for the valve stem is formed in the wheel body 2.

Wedge-shaped retainers 7 are located on the felly band 4, and are disposed on opposite sides of the opening 6, the retainers being held on the felly band by securing elements 8. The retainers 7 are equipped at their outer ends with inclined flanges 9. Studs 10 are mounted on the felly band 4 and project radially therefrom, the studs 10 and the retainers being spaced apart at equal distances about the periphery of the wheel.

The device comprises a plurality of wedge-shaped removable retainers 11 equipped at their outer ends with flanges 12 having finger pieces 14. The retainers 11 rest on the felly band 4 and extend transversely thereof, each retainer being supplied in one of its transverse edges 2 with a notch 15, there being a laterally extended seat 16 in the retainer 11 at the inner end of the notch 15. The studs 10 on the felly band 4 are received in the notches 15 of the retainers 11 and fit in the seats 16 of the retainers.

The retainers 7 and 11 carry a rim 17 of any desired construction, the rim serving as a mounting for the usual tire casing 18, the inner tube appearing at 19, and the valve stem for the tube being marked by the numeral 20.

The operation of the device contemplates the use of a tool including a handle 22 having a flattened foot 23 disposed about at right angles to the handle, as shown in Figure 7.

In practical operation, one portion of the rim 17 is mounted on the fixed retainers 7 behind the flanges 9, the valve stem 20 being inserted through the opening 6 in the wheel body 2. The entire rim 17 then is pushed into place, in abutment with the stop flange 5 of the felly band 4, as appears in Figure 2. The flattened foot 23 of the tool is inserted between the felly band 4 and the rim 17, the foot 23 of the tool being turned on an axis, by means of the handle 22, the rim 17 being forced away from the felly band 4. The wedge-shaped retainers 11 then are inserted endwise between the felly band 4 and the rim 17, in a direction transversely of the wheel. Then, the retainers 11 are shifted circumferentially of the wheel, thereby causing the studs 10 to enter the notches 15. The foot 23 of the tool is withdrawn, and as the rim 17 resumes its normal circular contour, the rim 17, bearing against the flange 12 of the retainer 11, moves the retainer a short distance in the direction of its length, and transversely of the wheel, thereby causing the stud 10 to be engaged in the seat 16 which exists in the retainer 11 at the inner end of the notch 15. The retainers 11 remain securely in place and afford an adequate support for the rim 17, but, through the instrumentality of the tool the rim can be removed in a very short space of time.

The wheel body, of course, need not be of the form hereinbefore described. Thus, in Figures 9 and 10, there appears a trough-shaped wheel body 24 comprising a base 25 and sides 26 and 27, the side 26 having an outwardly extended flange 28, corresponding to the part 5 of Figure 2, and the side 27 being equipped with an inwardly extended lip 29. The fixed retainers 9 of Figure 5 are replaced by angular retainers 30, extended outwardly across the lip 29 and secured at 31 to the base 25 of the wheel body 24. The studs 31 are secured to the base 25 of the wheel body 24 and have shoulders 32 on which the retainers of the kind shown in Figure 6 are adapted to rest, the operation of the device being the same as hereinbefore described.

What is claimed is:—

1. The combination with a wheel body and a rim, of studs on the wheel body, and retainers located between the body and the rim, the retainers having notches in their transverse edges for the reception of the studs, and there being seats for the reception of the studs, in the retainers, at the inner ends of the notches, the seats extending transversely of the wheel body.

2. The combination with a wheel body and a rim, of studs on the wheel body, and wedge shaped retainers located between the body and the rim, the retainers having notches in their transverse edges, adapted to receive the studs, and being provided, at the inner ends of the notches, with seats for the reception of the studs, the seats projecting transversely of the wheel body, the retainers having flanges which, cooperating with the rim, impart longitudinal movement to the retainers, to engage the studs in the seats.

In testimony that I claim the foregoing as my own, I have hereto affixed my signature in the presence of two witnesses.

FREDERICK W. FRENCH.

Witnesses:
C. F. HASSLER,
W. R. SNEED.